INVENTOR.
ALAN C. TRAUB

Feb. 3, 1970  A. C. TRAUB  3,493,290
THREE-DIMENSIONAL DISPLAY
Filed Jan. 14, 1966  4 Sheets-Sheet 4

INVENTOR.
ALAN C. TRAUB

United States Patent Office 3,493,290
Patented Feb. 3, 1970

3,493,290
THREE-DIMENSIONAL DISPLAY
Alan C. Traub, Framingham, Mass., assignor to The Mitre Corporation, Bedford, Mass., a corporation of Delaware
Filed Jan. 14, 1966, Ser. No. 520,708
Int. Cl. G02b 27/14
U.S. Cl. 350—174
14 Claims

ABSTRACT OF THE DISCLOSURE

A three-dimensional display is produced by providing images at an object field position which are representative of an object at particular object distances. The images at the object field are repeated at a flicker-free repetition rate and a variable focal length element is used to image each of the object field images in space, each image appearing at a spatial position corresponding to the object distance of the corresponding image at the object field. The sequence of images appears as a three-dimensional image of the object being displayed.

---

This invention deals with the presentation of three-dimensional or "3–D" displays. One of its objects is to provide the viewer with a display embodying several different clues from which he can draw inferences as to the depth of his field of view and the distances separating him from the various objects and field portions of which it is composed. Another object is to provide him with wide latitude in the magnification of distance and depth information and in its alteration and adjustment. Still another object is to dispense with all awkward projection and viewing paraphernalia such as dual images, spectacles of different colors or different polarization axes and the like.

The world in which we live is a three-dimensional world; but the retina of the eye, being a two-dimensional sensitive surface, can receive only a two-dimensional image. Hence our perceptions of distance and depth of field are inferences which we draw, immediately and unconsciously, from the several clues with which nature has provided us; namely, perspective, parallax, obscuration, shadowing and, in the narrow sense implying binocular vision, stereopsis. But it is quite otherwise when the object field from which the two-dimensional retinal image is derived is itself two-dimensional; e.g., a photograph, a painting, a diagram, a chart, a lantern slide, or the like. With a single such "flat" object field, several of the clues fail. While the observer can still infer that the photographer, the painter, or the draftsman *intended* to represent a three-dimensional object field, and may conclude that he succeeded or that he failed, such inferences are of the second order and are not of the same compelling and immediate character as the inferences drawn from the missing clues. Moreover, these second order inferences are dependent on the observer's familiarity with objects of the class depicted. Thus, for example, he knows that a horse is bigger than a dog; and if he sees a picture showing a horse and a dog with like sizes, he infers that the horse was furhter away from the camera or from the painter's easel than was the dog. Evidently, even the drawing of such second order inferences fails in the case of representations of objects with which the observer has no acquaintance. Yet it is frequently in this very situation that the immediate perceptions of distance and depth are of greatest importance.

It is with the hope of to some extent overcoming these difficulties that various schemes and contrivances have been proposed which, with the aid of apparatus of varying degrees of complexity and with varying degrees of success, provide the viewer with a three-dimensional display.

The best known of these requires two independent photographs (or drawings, etc.) taken from different points of view so that they are not quite, though nearly, alike. When one of these is viewed with the left eye alone and the other with the right eye alone, the observer receives an impression of depth, at least for nearly objects and field portions. Aside from the need for special equipment, such as differently colored spectacles, for excluding the right eye image from the left eye and vice versa, it is disconcerting to the viewer to find that, when he moves his head, he cannot "see around" a near object to examine a far object which, for one position of his head, was concealed. To the contrary, the entire field of view appears to turn.

According to another proposal, the various parts of a two-dimensional object field are projected intermittently and cyclically at a frequency above the flicker perception frequency, some apparatus element of the projection system meanwhile being bodily moved in synchronism with the intermittent projection. The element thus moved may be the projection screen, the face of a cathode-ray oscilloscope bearing an illuminated pattern constituting a part of the object field, or a lens or a mirror through which the screen or the scope face is viewed, or the like. Persistence of vision then enables the viewer to see the different portions of the field as one, its parts being variously located in the depth dimension in dependence on the movements of the apparatus element. Such a system is illustrated, expounded and explained in Ferrill Patent 2,361,390. With presently available sources of brief, high powered light flashes the illumination, in succession, of the various portions of the object field presents no problem. The system is restricted, however, to an inconveniently narrow range of distance or depth, and this because mechanical considerations, notably the inertia of the element moved, severely limit the extent of the excursions which can be imparted to it at the necessary high frequency.

The Ferrill patent includes a modification in which a plane mirror is oscillated in such a way as to provide a moving image of a stationary cathode ray tube screen. As compared with movement of the tube itself, it is apparent that the problem of mechanical inertia is considerably reduced through this modification because a mirror is basically a lighter-weight device than the cathode ray tube. Nonetheless, at the requisite frequencies, mirror excursions greater than an inch or two are not feasible with this device; and since the image excursions is just double the mirror excursion, image display volumes of only a few inches in depth are achieved.

The present invention follows the general approach of the Ferrill patent but with particular reference to the case in which the *image* is oscillated through use of a moving mirror.

In the present invention, the oscillating mirror of the Ferrill patent is replaced by a deformable mirror or lens whose edges are substantially fixed in space but whose central regions are caused, in the course of periodic deformations, to undergo slight periodic excursions in such a way as to achieve large focal length variations rapidly and repetitively.

It is an inherent feature of optical lenses and mirrors that appropriate deformations of their surfaces, with consequent changes in focal length, have the ability to translate the positions of images formed by them, in much the same way as can be done by physically moving a rigid lens or mirror; however, the amount of deformation which is required in order to translate an image by a given distance with a deformable element is drastically smaller than the amount by which one would be required to move a rigid optical element in order to achieve the same image motion. The mechanical problem of moving rigid masses through fairly large excursions at frequencies higher than the flicker perception frequency of the eye is thus greatly reduced, and substantially larger depths of the display volume can be achieved quite readily.

As an example, in an illustrative embodiment of this invention, a metallized plastic membrane is stretched tightly across a circular supporting frame which is fastened against the rim of a loudspeaker cone of appropriate size. A low voltage alternating electrical signal of a frequency above the flicker perception frequently is applied to the coil of the loudspeaker. The resulting motion of the loudspeaker cone is transmitted pneumatically to the membrane mirror which thereupon is caused to undergo cyclic deformations about its normally flat configuration. The deformations take the form of approximately spherical surface configurations, being alternately of positive and negative curvature. At the center of the mirror, where the excursions are the greatest, the amount of mirror motion along the axis is typically a small fraction of an inch, of the order of one-sixteenth to one-eighth inch. The resulting depth of the display volume which is thereby achieved can be as great as several feet, depending upon the object-to-mirror distance.

With such a system, using a deformable mirror or lens, the clues of parallax, obscuration, and stereopsis are fully available to the viewer as in the prior system cited; with the addition of certain refinements, the perspective clue becomes available also.

The invention will be fully apprehended from the following detailed description of illustrative embodiments thereof taken in connection with the appended drawings of which:

FIG. 8a is a two-dimensional representation of a group of three-dimensional images;

Figure 1:
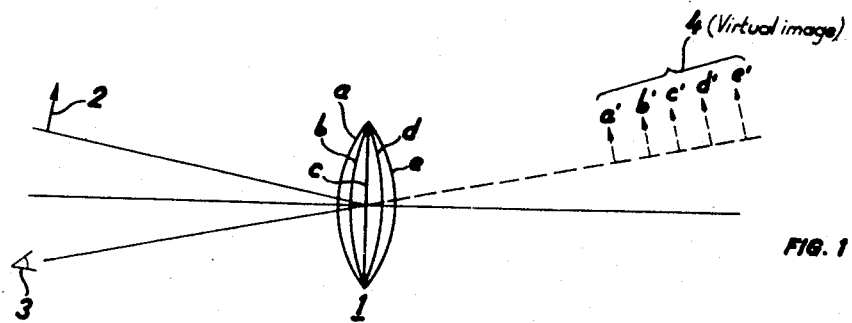
FIG. 1 is a ray diagram showing the formation of virtual images with the aid of a deformable mirror.

Referring now to the drawings, FIG. 1 reveals the principles on which the invention is predicated. A deformable varifocal element, illustratively a mirror 1, is mounted at a convenient fixed distance from an object conventionally represented as an arrow 2. The mirror 1 receives rays of light from the object 2 and reflects them into an observer's eye 3, whereby the observer sees, behind the mirror 1, a virtual image 4 of the object 2. Before the mirror 1 is deformed its surface is flat as indicated at $c$ and the virtual image $c'$ is of the same size as the object, and at a distance from the mirror 1 equal to the object distance. The figure shows, in outline, four additional curves, and each of them is a cross-section of the mirror face when it is deformed. Of these, $a$ and $b$ show the cross section of the mirror 1 when its surface is convex toward the observer, while the curves $d$ and $e$ show its cross-section when the mirror is concave towards the observer. As its convexity increases, the corresponding virtual images 4 approach closer to the mirror and are diminished in size as indicated at $b'$ and $a'$. Similarly, when the mirror is concave (and provided its focal length is greater than the object distance), the virtual images are progressively increased in size and in distance, as indicated at $d'$ and $e'$.

When the deformation of the mirror 1 indicated in FIG. 1 is carried out cyclically and at a frequency above the flicker perception rate of the eye, the image 4 adopts the positions and sizes indicated at $a'$, $b'$, $c'$, $d'$, and $e'$ in the course of one deformation half cycle. Hence, if the object 2 is a single one and is continuously illuminated, the image as seen by the eye becomes a blur; but if, instead, the object is illuminated only briefly and for a period so short that, throughout the burst of light, the curvature of the mirror face does not change significantly, only one of the virtual images $a'$, $b'$, $c'$, $d'$ and $e'$ is visible to the eye 3 and it appears with a size and at a location dependent on the phase of the deformation cycle in which the light burst takes place. Again, if a set of objects or a set of different portions of an object field are consecutively illuminated in this fashion, each at a different phase of the deformation cycle, their images appear separate and distinct and located at different distances from the observer's eye 3. By the well known phenomenon of stereopsis, the observer thus receives an impression of depth in the image field and is enabled to draw an inference that the several objects or object field portions are themselves located at different distances from him. This inference is strongly reinforced by the parallax which inheres in the image space. Thus, for example, if the images of two different objects or two different portions of the object field appear at $a'$ and at $e'$, the observer, having seen the image $e'$ lying immediately behind the image $a'$ for one position of his head then, by moving his head to the left, he sees $e'$ to the left of $a'$ and by moving his head to the right, he sees $e'$ to the right of $a'$. It is thus immediately impressed upon him that the image $e'$ is more distant from him than is the image $a'$. And, provided he is unconscious of the fact that this impression is due to the deformation of the mirror, he infers that the object of which $e'$ is the image is further from him than is the object of which $a'$ is the image.

In the figure, the object 2 and the eye 3 are displaced at equal angular distances from the optical axis of the varifocal element; i.e., from the axis normal to the undeformed face of the mirror 1. A certain amount of head motion restriction is implied by this arrangement, for the observer cannot move his head as freely as he might desire without interfering with the apparatus which is generating the two-dimensional object pattern. This problem can be alleviated either by tilting the mirror so that its axis makes a greater angle with the mirror-to-object axis, or by the expedient of using a beam splitter such as a semi-transparent mirror in the manner shown in FIG. 2. Here, the object 2 is disposed on the axis of the deformable mirror 1 and light reaches this mirror through a semi-transparent fixed mirror 5 to form, in the image space, primary virtual images 4 that are likewise on the mirror axis. These can be viewed, as secondary virtual images 6, by the observer's eye 3 along a line at right angles to the axis of the deformable mirror 1 by reflection in the semi-transparent mirror 5. Thus, at the price of a reduction of the intensity of the image illumination by a factor of four, the restrictions to off-axis viewing are removed.

Figure 2:
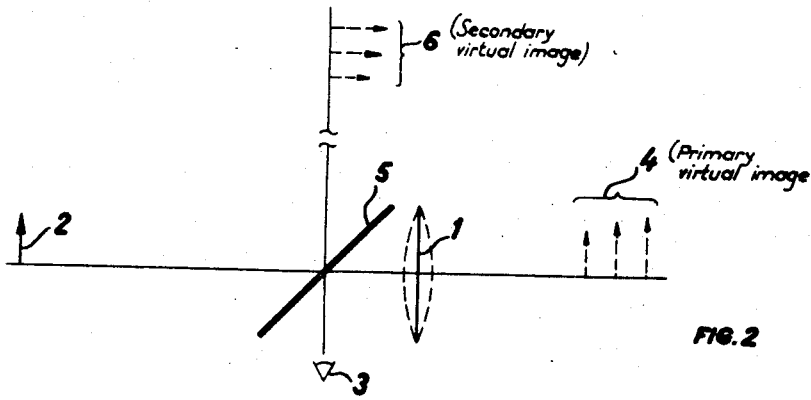
FIG. 2 is a diagram illustrating a first alternative to FIG. 1.

It will be observed in FIGS. 1 and 2, that the greater the distance of the image from the mirror 1, the greater will be its size. This result, of course, is a departure from the laws of true perspective and might seem to offset the impression of distance formed in the observer's mind, as discussed above. It will re recalled, however, that the various images indicated in FIGS. 1 and 2 are in fact images not of a single fixed object, but of different objects or different portions of an object field that are consecutively illuminated and, in practical situations such as that of FIGS. 8 and 9, described below, portions with which the observer may have no previous acquaintance. Indeed, in this situation the several object field portions are themselves artificial representations of objects in the physical world, and their sizes are tailored to suit the needs of the display. Thus there is no necessary preassigned relation among the sizes of these object field portions, and therefore no preassigned relation which should hold among the sizes of the virtual images. Hence, in the usual situation, the observer is not disturbed.

Additionally, of the various clues from which an observer derives an impression of distance, experiments show that parallax is more compelling than is perspective.

Figure 3:
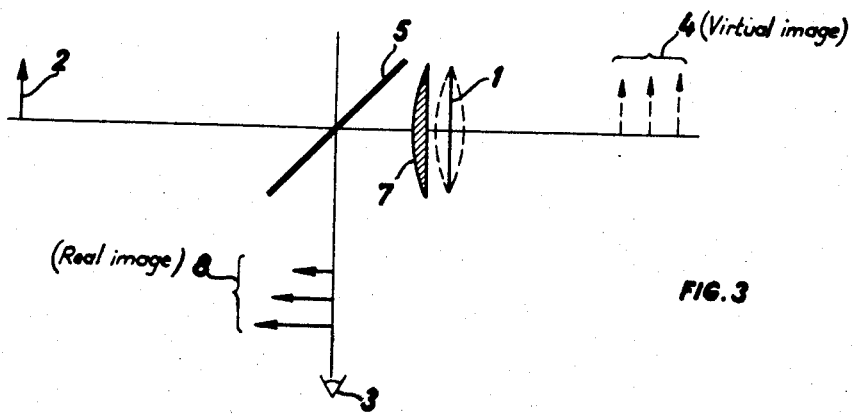
FIG. 3 is a diagram illustrating a second alternative to FIG. 1.

If, despite these considerations it should be considered important that the nearer images appear larger and the further ones smaller, a relay lens 7 of fixed focal length may be disposed immediately in front of the deformable mirror 1 as shown in FIG. 3. Provided only that its focal length is properly chosen, that is to say, provided only that it is so proportioned that the focal length of the lens-mirror combination is at all times less than the object distance, the virtual images 4 behind the deformable mirror 1 are replaced by real images 8 shown on the vertical axis which passes through the observer's eye 3. These real images 8 satisfy the requirements of true perspective in that those further from the eye are smaller and those closer to the eye are larger. At the price of oblique viewing as in FIG. 1, the same result can be achieved without the beam splitter 5. These real images offer the further advantage that the observer may approach his eye as close as he wishes to them, thus to inspect them in detail.

Figure 4:
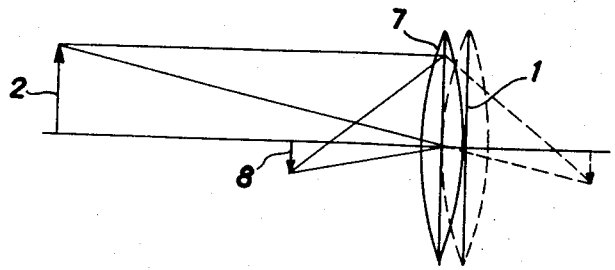
FIG. 4 and FIG. 5 are ray diagrams showing the equivalence of a deformable concave mirror with the combination of a fixed, unyielding lens and a deformable flat mirror.
Figure 5:
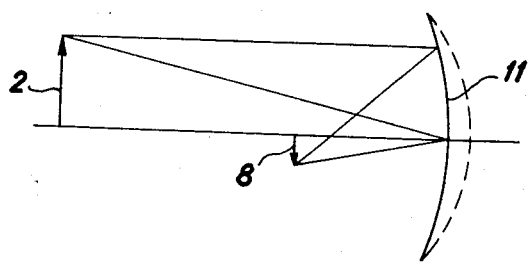

FIG. 4 shows a conventional ray diagram for an arrangement such as that of FIG. 3, and FIG. 5 shows a similar ray diagram for a deformable concave mirror. Provided only that the focal distance of the combination of the deformable mirror 1 with the fixed relay lens 7 of FIGS. 3 and 4 is the same as the focal length of the concave deformable mirror 11 of FIG. 5, and that both of these focal lengths are less than the object distance for all degrees of deformation of the mirror 11, real images 8 of like image distances and like magnifications are formed in the two cases from objects 2 of like sizes and like object distances.

Figure 6:
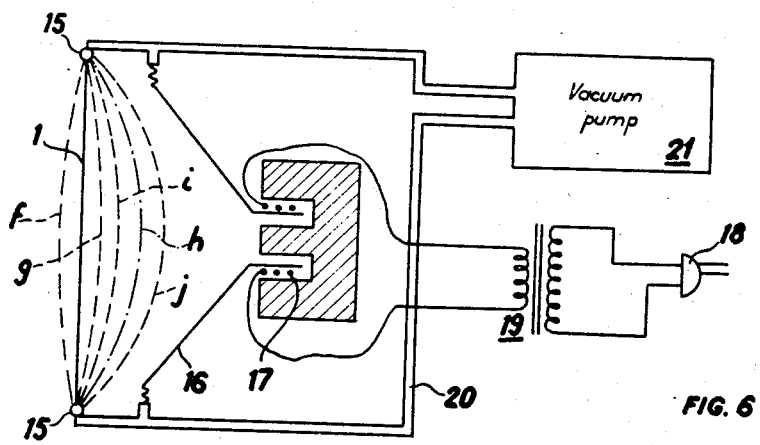
FIG. 6 shows apparatus for cyclically deforming a mirror of yielding material and for optionally imparting to it initial curvature in a desired amount.

The deformable varifocal element of the invention may be constructed in various ways. One such element with which highly successful three-dimensional displays have been generated is shown in FIG. 6. It consists of a sheet or membrane of thin, yielding plastic material of which the outer face is coated with a specularly reflecting metal. Like a drumhead, this sheet is supported at its periphery on a hoop 15, advantageously of circular form. Such a mirror may be cyclically and reciprocally deformed, from curve f to curve g, by pneumatic means. To this end, the rear face of the mirror 1 is backed by the cone 16 of a coil 17 is energized by alternating current. The energization frequency should be above the flicker perception rate of the eye and, since actuation at 60 cycles per second takes advantage of conventional standard equipment, the driving source is indicated merely as a conventional plug 18 which may be fitted into a conventional 60 cycle power outlet. A transformer 19 is included to bring the voltage to a magnitude for which the "voice" coil 17 may have been designed. Driving power may be conserved by proportioning the tension of the mirror 1, the cone 16 of the sound reproducer and the internal volume of a container 20 which encloses them in accordance with well-known acoustical principles to make for resonance at the selected frequency.

When, as indicated by the solid line, the undeformed face of the mirror 1 is flat, it generates virtual images at various distances from the observer in the manner explained in connection with FIGS. 1 and 2. To generate real images, in contrast to virtual images, the reflecting face of the mirror, if employed alone should, for every phase of its cyclic deformations, be concave and of a focal length less than the object distance; i.e., as shown by means curve h and vibrated curves i and j. This result can readily be secured by applying a pressure bias to the reflecting film, e.g., by partial evacuation of the supporting container 20 as by a vacuum pump 21, thus to give the mirror an initial configuration as shown at h. To avoid applying static differential pressures between the two faces of the sound reproducer cone 16, this partial evacuation is advantageously applied to the entire interior of the container 20. If, to the contrary, real images are to be generated with the aid of the relay lens 7 of FIG. 3, the pressure bias may be dispensed with and the mirror face, before the cyclic deformations are applied to it, may be flat.

If preferred, an electrostatic drive may be substituted for the pneumatic drive of FIG. 6. In this method of driving the mirror, convenient use may be made of the electrically conducting properties of the reflecting metallic layer on the membrane. The membrane would thus be made to comprise one plate of an electrical condenser, with the other plate being rigid and disposed parallel and adjacent to it such that when a suitable alternating voltage is applied between the plates, the desired mirror motion will result.

Figure 7:
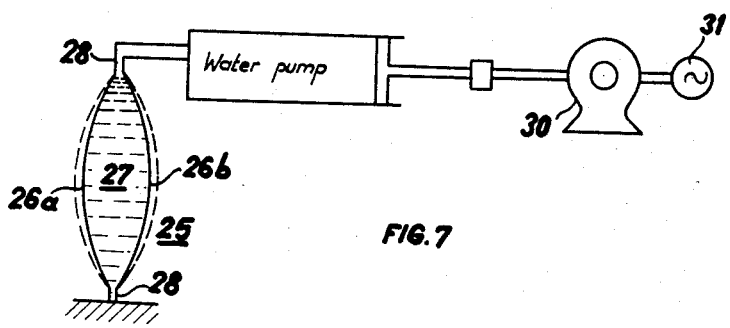
FIG. 7 shows a deformable lens and apparatus for reciprocally deforming it.

Under some circumstances, it may be desirable that the image be viewed by light transmitted through the varifocal element instead of reflected from it. In such cases, a deformable lens 25 as shown in FIG. 7 may be substituted for the mirror of any of the foregoing figures, with appropriate alteration in well known manner of paths of the light rays shown for reflection in FIGS. 4 and 5. Such a deformable lens may be constructed of two thin transparent plastic sheets 26a, 26b carrying, between them, a volume of liquid 27 having a refractive index significantly different from that of the air or of other external medium surrounding the lens. The two plastic films 26a, 26b, advantageously of circular outline, can be supported on a hoop 28 pierced by an orifice through which the refractive liquid 27 is introduced. After a sufficient amount of liquid has been introduced to endow the faces of the lens 25 with desired mean curvatures, the lens 25 may be cyclically deformed by periodically introducing an increment of the liquid mass 27 into the space between the plastic films 26a, 26b and removing it again, at a suitable frequency. For this purpose a water pump 29 is shown consisting merely of a cylinder and a piston, driven by a motor 30 energized by a source 31. Because of the greater difficulty of pumping a mass of water, as compared with pumping a volume of air, it may be advantageous to keep the pumping frequency as low as possible consistent with the requirement that it be above the flicker perception frequency of the eye.

Figure 8:
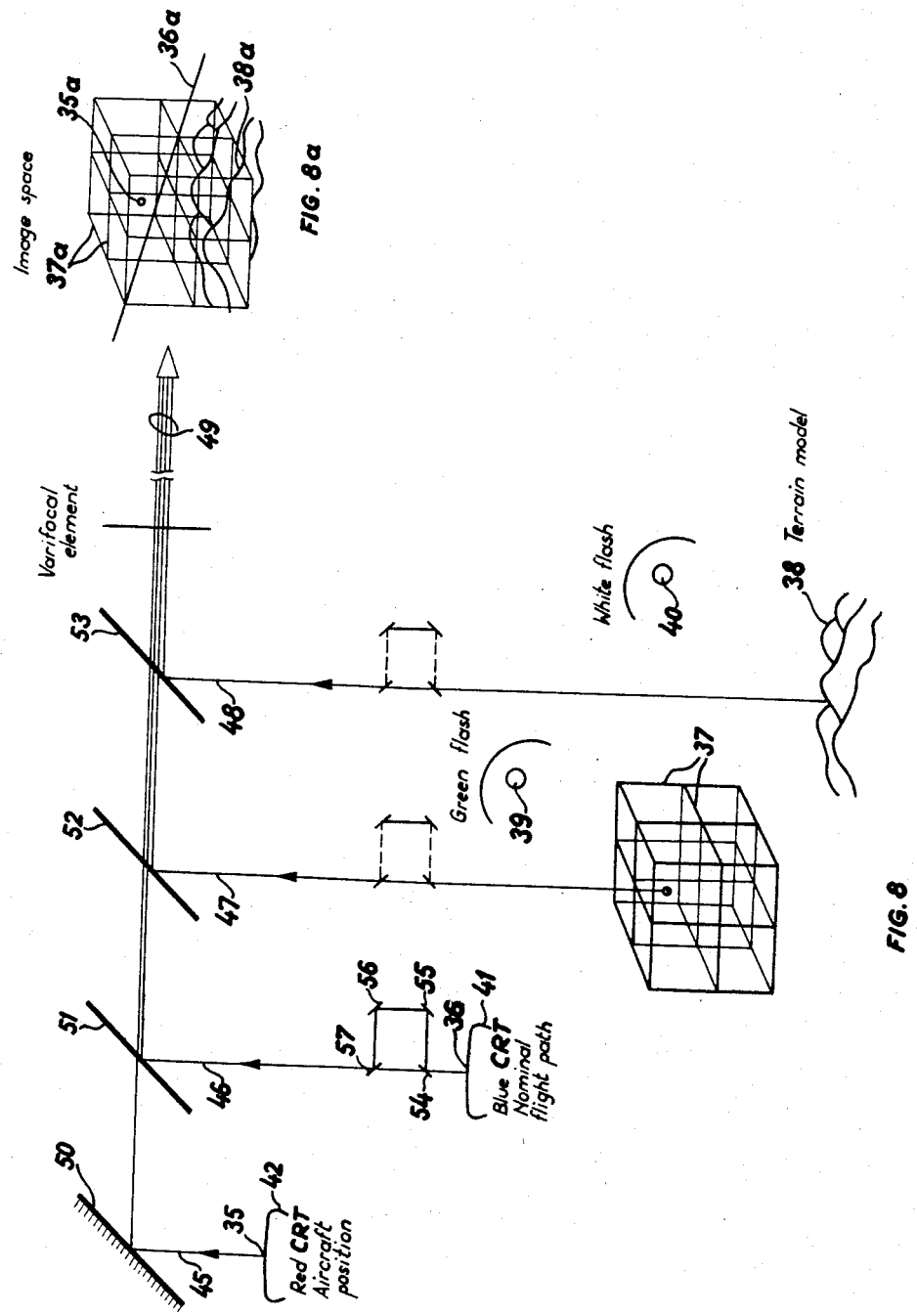
FIG. 8 is a ray diagram showing the manner in which beams of light originating in various object field portions are together projected on the deformable varifocal element for the generation of images in depth.

The modern world presents many situations in which a realistic presentation of three-dimensional images derived from various portions of a three-dimensional object field, is desirable. One illustration is provided by a busy airport in which the aircraft dispatcher, working in the control tower, must know at every instant the momentary position and speed of each of the many aircraft under his supervision in relation to the landing field, runways, obstructions and the like. To prevent disaster it must be instantaneously revealed to the dispatcher just what is the exact position of an aircraft, not only in the north-south dimension and in the east-west dimension, but in the dimension of altitude as well. FIGS. 8 and 8a indicate schematically the kind of information which the dispatcher needs and the manner in which it may be presented to him through the agency of the invention. One such information item is the actual momentary position (35a) of the aircraft in all three space dimensions. A second such item is the nominal flight path (36a) of the aircraft. A third is a three-dimensional grid 37, included to facilitate the dispatcher's estimate of aircraft position. A fourth may be a relief model 38 of obstructions, illustratively, a range of hills. Advantageously, the measurement grid 37 and the terrain model 38 are illuminated by brief light flashes, e.g. by sources 39, 40 each once during each deformation cycle of the varifocal element, and at recurrent phases of the cycle. The same holds of the nominal flight path information item 36. This may be drawn by a draftsman beforehand, e.g., on a transparent plastic sheet so that its image 36a is presented in the same way as are the images 37a, 38a of the measurement grid and the terrain model and at the proper height above the ground image. Alternatively, by appropriate programming of the signals applied to the deflecting elements of a cathode ray tube 41, the plan view or horizontal projection of the flight path may be caused to appear on the face of the tube 41. Energization of the control grid of the tube 41 in correct phase relation with the deformation of the varifocal element then causes the flight path image 36a to appear at the proper altitude. This approach, while somewhat more complicated than the former one, offers the advantage that, simply by altering the deflection program and the energization phase, the image 36a of the flight path may, at a moment's notice, be altered in any one or two space dimensions or in all three of them. By control of the deformation cycle phase at which the drawing is illuminated or the tube 41 is energized, the flight path image is caused to appear at the proper height above the ground image.

The first information item representing the momentary position in space of an aircraft, for example an aircraft being guided in to a landing, is derived from a luminous spot 35 on the face of a cathode-ray tube 42, and its image 35a is presented to the dispatcher by causing this spot to appear once during each cycle of deformation of the varifocal optical element, and at a phase of this cycle such as to cause the image to appear above the ground image at a changing height conformable with the changing altitude of the true aircraft above the true ground. To this end the phase, at which the image of the luminous spot 35 on the face of the cathode-ray tube 42 appears, is continuously shifted in conformance with the change of altitude of the aircraft as it takes off or approaches for a landing.

To avoid complexity of the drawing, the varifocal element of the invention is merely indicated and light beams from the four information items are indicated as passing through this element. Such is the case if the element is a lens, e.g., the lens 25 of FIG. 7. If, as preferred, the varifocal element is a mirror (1, 11) the several light beams 45–48 are to be reflected from it in the fashion described above.

To avoid interference among these light beams, they may be brought into a single bundle 49 before application to the varifocal element through the agency of a group of mirrors 50–53 of which the first is fully reflecting, while the others are partially reflecting. Supplementary mirrors, e.g., the mirrors 54–57 or some equivalent, serve to equalize the lengths of the several light beams. In order to reduce to a minimum all chances of confusion by the dispatcher among the images of the various portions of the object field, the images may be in different colors as indicated, the mirrors 51–53 being endowed with corresponding color selectivity. For example, the second mirror 51 may be a dichroic beam splitter which transmits red light and reflects blue light, the third 52 may transmit red and blue light and reflect green light, while the fourth 53 may be merely a semitransparent mirror of no color selectivity. With this arrangement, the aircraft position image 35a is a red dot in the three-dimensional image space, the nominal flight path image is a blue line 36a, the measurement grid image 37a is a green net, while the image 38a of the terrain model is in black and white.

If confusion among the various portions of the image field presents no problem, the bundling mirrors 50–53 of this figure need have no color-selective properties, in which case the intensities of the light beams 45–48 from the several portions of the object field may be equalized at the varifocal element by arranging their transmittances and reflectances according to the following scheme:

The first mirror 50 reflects all incident light and transmits none; the second mirror 51 transmits one half of the incident light and reflects the other half; the third mirror 52 transmits two-thirds of the incident light and reflects one-third; and the fourth mirror 53 transmits three-fourths of the incident light and reflects one-fourth.

Figures 9, 10:
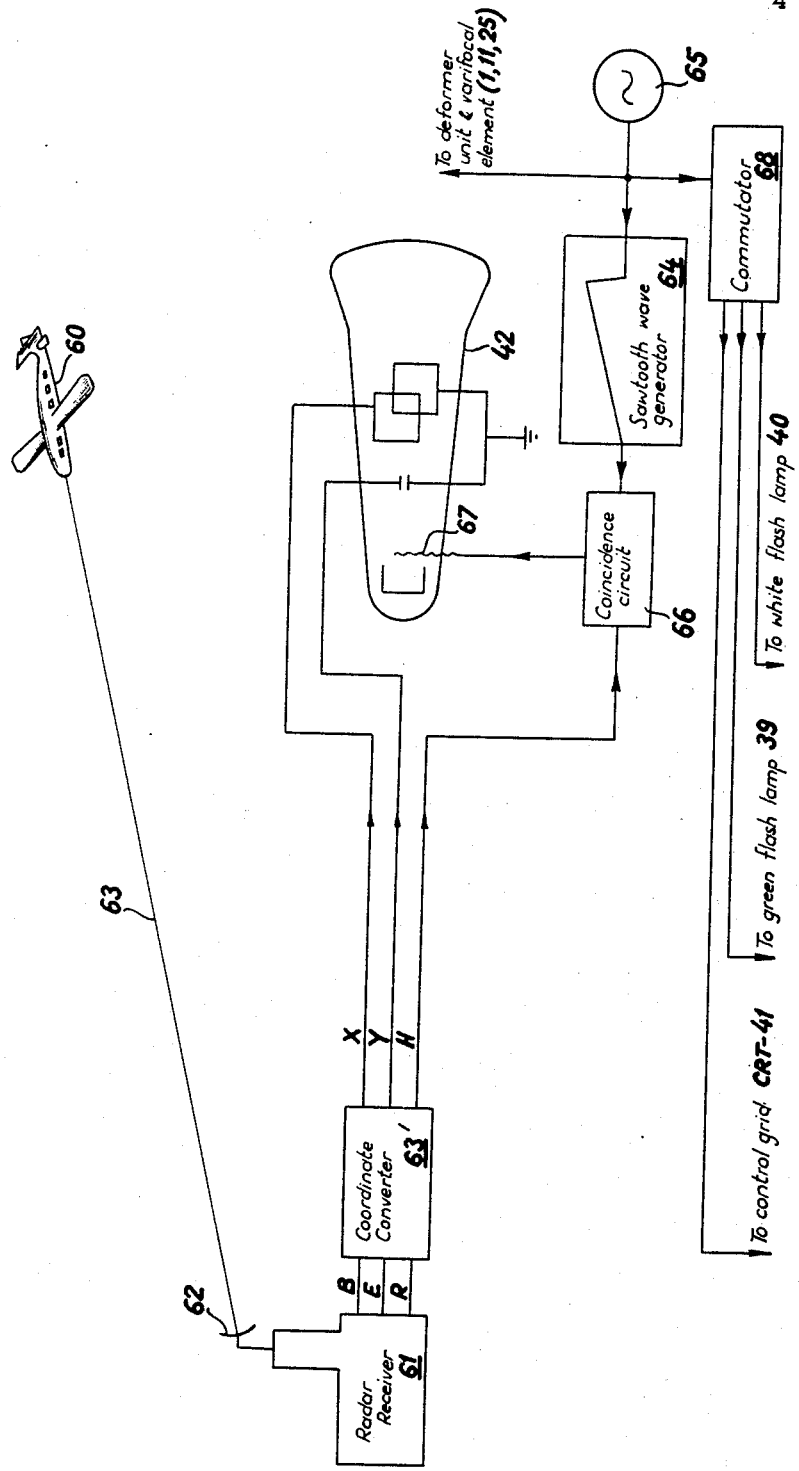
FIG. 9 is a schematic diagram illustrating the use of the invention in generating a three-dimensional display.
FIG. 10 is a diagram showing a symmetrical sawtooth wave.

FIG. 9 shows one arrangement by which the information as to the momentary position of an aircraft 60 can be developed and presented. A conventional radar apparatus 61, including an antenna 62 generates a radar beam 63 which is reflected on the aircraft 60 and returned. Servomechanisms keep the radar antenna 62 trained on the aircraft 60 both in bearing and in elevation and the apparatus 61 delivers indications of these quantities as well as of the distance or range from the antenna 62 to the aircraft 60. These three quantities are changed by a coordinate converter 63' into Cartesian coordinates indicated as X, Y and H. The X (east-west) information is applied to the horizontal deflecting elements of the cathode-ray tube 42 and the Y (north-south) information is applied to its vertical deflecting elements. As explained above, the luminous spot 35 must appear on the face of the cathode-ray tube 42 at a particular instant during each deformation cycle of the varifocal element 1, 11, or 25 and this is accomplished in the arrangement of FIG. 9 in the following way: A saw-tooth wave is developed by a conventional generator 64 in synchronism with the deformation of the varifocal element. This is indicated by a common source 65 to drive the tooth generator 64 and the deforming unit, e.g. the coil 17 of FIG. 6, of the varifocal element together. The saw-tooth wave thus generated is applied to one input point of a coincidence circuit 66, and the altitude coordinate H is applied to the other input point. When the two coincide, the control grid 67 of the cathode-ray tube 42 is actuated, thus to develop a luminous spot 35 on its face. By virtue of the saw-tooth character of the wave applied to the first input point of the coincidence circuit 66, the spot is thus illuminated at a particular instant of each deformation cycle, and at no other time. The common source 65 also drives a commutator 68 which delivers power to the control grid of the second cathode-ray tube 41 thus to generate the flight path image 36a, to the green flashlamp 39 of FIG. 8 and to the white flashlamp 40 of FIG. 8, thus to illuminate the measurement grid 37 and the terrain model 38 respectively, each at appropriate phases of the deformation cycle of the varifocal element.

The deformation of the varifocal element (1, 11, 25) takes place in reciprocal fashion, for example, sinusoidally. It thus passes through each curvature condition twice during each cycle, once as it moves forward, and again as it moves backward. In contrast, the saw-tooth wave delivered by the generator 64 rises linearly and continuously from its start to its finish and returns abruptly to its starting point. If such a generator is employed, the wave period must evidently be coordinated not with the full cycle of deformation of the varifocal element but with one half cycle. Furthermore, either by the introduction of a pause of the same duration between each saw-tooth and its successor, or by preconditioning the coincidence circuit 66, it must be arranged that the luminous spot 35 appears on the face of the cathode-ray tube 42 only during excursions of the deformable element in one sense.

If preferred, the luminous spot 35 may be caused to appear twice during each deformation cycle, once during the forward excursion and again during the backward excursion. This result is readily obtained by the substitution for the saw-tooth generator 64 of another generator, proportioned to deliver a symmetrical wave as shown in FIG. 10. Generators of this sort are well known. One such generator is described in Meacham Patent 2,669,656, to which reference is made for details. With such a symmetrical wave, the full wavelength may be coordinated with the full deformation cycle of the varifocal element. Here two points, $k$ and $l$, indicate phases of the symmetrical saw-tooth wave and hence of the deformation cycle, at which the radar altitude information causes the appearance of a luminous spot on the cathode-ray tube screen. In the course of the following saw-tooth wave cycle, two other points $m$ and $n$ have the same significance. Evidently, luminous spots developed at the instants $k$ and $l$ make for images 35a at one apparent height above the ground image, while those developed at the instants $m$ and $n$ make for images at a widely different height above the ground image.

The linear rise of the saw-tooth waves of FIG. 9 and the linear rise and fall of the saw-tooth waves of FIG. 10, when combined with sinusoidal deformation of the varifocal optical element, make for some departure of the apparent image height from exact correspondence with the true aircraft altitude. This can be overcome by introducing into the rise and fall of the saw-tooth wave a complementary nonlinearity; i.e., instead of a linear function of the time base, the output of the generator may be a nonlinear one of appropriate form.

By combining, in known manner, signals representative of the momentary space coordinates of several different aircraft, whether developed by a single radar apparatus or by different ones, the invention permits the projection into the image space of luminous image spots that are individually representative of the momentary positions of such aircraft. To avoid confusion, they may be presented in different colors.

The real life situation depicted in FIGS. 8 and 9 is merely illustrative of the many uses to which the invention may be put. Others include analysis of mathematical functional relationships, analysis of electrical or other signals, psychophysical testing procedures involving depth perception, motion pictures, television or other representations of spatial models for educational, entertainment, or artistic purposes. Still others will suggest themselves to those versed in the art.

What is claimed is:

1. Three-dimensional display apparatus which comprises means including
    a variable focus mirror,
    said mirror comprising a membrane of thin, yielding plastic material,
    one surface of said plastic material being coated with a specularly reflecting material,
    means to deform cyclically and reciprocally said mirror to vary its focal length,
    said cyclical deformation being performed at a rate exceeding the flicker-perception rate of the human eye,
    an object field,
    means to provide at the object field images representative of portion of an object at different object distances,
    means for producing briefly and consecutively light beams originating at said object field,
    said variable focal length mirror being disposed in the path of said light beams,
    means to vary the focal length of said mirror in coordination with the object distance corresponding to the object-field image then being illuminated,
    said variation being produced by deforming said mirror,
    the deformation phase of said mirror being correlated in time with the object-field image then being illuminated to provide an image at an image position proportional to the relative position within the object occupied by the object portion depicted in said object field,
    whereby there is developed in an image space images of consecutive portions of the object,
    said images appearing at positions corresponding with the object distance of corresponding object portions to produce a three-dimensional image representative of said object.

2. Three-dimensional display apparatus which comprises means including
    a variable focus mirror,
    said mirror comprising a membrane of thin, yielding plastic material of high dimensional stability,
    one surface of said plastic material being coated with a specularly reflecting metal,
    means to deform cyclically and reciprocally said mirror to vary its focal length,
    said cyclical deformation being performed at a rate exceeding the flicker-perception rate of the human eye,
    an object field,
    means to provide at the object field images representative of portions of an object at different object distances,
    means for producing briefly and consecutively light beams originating at said object field,
    said variable focal length mirror being disposed in the path of said light beams,
    means to vary the focal length of said mirror in coordination with the object distance corresponding to the object-field image then being illuminated,
    said variation being produced by deforming said mirror,
    the deformation phase of said mirror being correlated in time with the object-field image then being illuminated to provide an image at an image position proportional to the relative position within the object occupied by the object portion depicted in said object field,
    whereby there is developed in an image space images of consecutive portions of the object,
    said images appearing at positions corresponding with the object distance of corresponding object portions to produce a three-dimensional image representative of said object.

3. Apparatus as set forth in claim 1 and provided with a lens,
    said lens disposed in the path of the light beams reflected from said mirror,
    whereby the relative sizes of near and far portions of said three-dimensional image appear in a proper perspective relationship.

4. Apparatus as set forth in claim 1 wherein means are provided to magnify the object-field images of object portions nearer to the observer with respect to object-field images representative of object portions more distant from the observer
    whereby the three-dimensional image comprises image portions bearing a proper perspective relationship.

5. Apparatus according to claim 1 comprising in addition
    a reference model,
    beam splitting means to super-impose an image of said reference model upon reflected object-field images,
    whereby the three-dimensional image comprises images of the object super-imposed in three-dimensional relationship upon the reference model.

6. Apparatus according to claim 5 wherein the path of the light rays from said reference model includes path length adjusting means,
    said path length adjusting means being adjusted to provide a total path length for the image of said reference model equal to the path length from said object field to the three-dimensional image.

7. Apparatus according to claim 1 wherein said object field is provided with images of a subject object,
    beam splitting means,
    means to supply via said beam splitting means images representative of a desired spatial performance for said subject object,
    whereby said images representative of desired performance are super-imposed upon the object images as reflected by said mirror, whereby said three-dimensional image provides a three-dimensional view of the relationship of the desired object to its desired performance.

8. Apparatus according to claim 7 wherein the path of the images representative of desired performance is provided with path lengths adjusting means, whereby the path length for said images of desired performance is adjusted to equal the path length from said object field to said three-dimensional image.

9. Apparatus as set forth in claim 2 and provided with a lens, said lens disposed in the path of the light beams reflected from said mirror, whereby the relative sizes of near and far portions of said three-dimensional image appear in a proper perspective relationship.

10. Apparatus as set forth in claim 2 wherein means are provided to magnify the object-field images of object portions nearer to the observer with respect to object-field images representative of object portions more distant from the observer whereby the three-dimensional image comprises image portions bearing a proper perspective relationship.

11. Apparatus according to claim 2 comprising in addition a reference model, beam splitting means to super-impose an image of said reference model upon reflected object-field images, whereby the three-dimensional image comprises images of the object super-imposed in three-dimensional relationship upon the reference model.

12. Apparatus according to claim 11 wherein the path of the light rays from said reference model includes path length adjusting means, said path length adjusting means being adjusted to provide a total path length for the image of said reference model equal to the path length from said object field to the three-dimensional image.

13. Apparatus according to claim 2 wherein said object field is provided with images of a subject object, beam splitting means, means to supply via said beam splitting means images representative of a desired spatial performance for said subject object, whereby said images representative of desired performance are super-imposed upon the object images as reflected by said mirror, whereby said three-dimensional image provides a three-dimensional view of the relationship of the desired object to its desired performance.

14. Apparatus according to claim 13 wherein the path of the images representative of desired performance is provided with path lengths adjusting means, whereby the path length for said images of desired performance is adjusted to equal the path length from said object field to said three-dimensional image.

References Cited

UNITED STATES PATENTS

| | | | |
|---|---|---|---|
| 1,906,803 | 5/1933 | Mueller. | |
| 2,300,251 | 10/1942 | Flint | 350—180 |
| 2,361,390 | 10/1944 | Ferrill | 178—6.5 |
| 2,982,179 | 5/1961 | Lace | 350—285 X |
| 3,031,928 | 5/1962 | Kopito | 350—295 |

JOHN K. CORBIN, Primary Examiner

U.S. Cl. X.R.

178—6.5; 350—144, 180, 295

PO-1050
(5/69)

UNITED STATES PATENT OFFICE
CERTIFICATE OF CORRECTION

Patent No. 3,493,290                              Dated February 3, 1970

Inventor(s) Alan C. Traub

It is certified that error appears in the above-identified patent and that said Letters Patent are hereby corrected as shown below:

In Column 2, line 6 change "nearly" to --nearby--.

In Column 4, line 73 change "re" to --be--.

In Column 5, line 55 after "a" insert --conventional sound reproducer of which the "voice"--.

In Column 6, line 41 change "ben" to --been--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents